US006351291B1

(12) United States Patent
Asano (10) Patent No.: US 6,351,291 B1
(45) Date of Patent: Feb. 26, 2002

(54) IMAGE PROCESSING APPARATUS FOR AN ON-SCREEN-DISPLAY WHICH DISPLAYS ONE IMAGE OVER ANOTHER IMAGE

(75) Inventor: Masanari Asano, Kurokawa-gun (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/537,389

(22) Filed: Mar. 29, 2000

(30) Foreign Application Priority Data

Mar. 30, 1999 (JP) .......................................... 11-089366

(51) Int. Cl.⁷ ............................ H04N 5/445; H04N 5/45
(52) U.S. Cl. ....................... 348/564; 348/567; 348/565; 348/569
(58) Field of Search ................................ 348/563, 564, 348/565, 566, 567, 569, 584, 586, 589, 598, 599, 600, 714, 715, 716, 717, 718, 719; 345/545, 547; H04N 5/445, 5/45, 9/74, 9/76

(56) References Cited

U.S. PATENT DOCUMENTS 5,818,466 A * 10/1998 Ryu .......................... 348/586

* cited by examiner

Primary Examiner—Sherrie Hsia
(74) Attorney, Agent, or Firm—Arent Fox Kintner Plotkin & Kahn PLLC (57) ABSTRACT

An image processing apparatus comprises an image memory comprising a first storing area for storing first image data for a background and a second storing area for storing second image data for an on-screen-display; a display buffer memory for storing data in a format used for display based on the first and second image data read from the image memory; and a controller for controlling accesses to the image memory and the display buffer memory, the controller reading the first image data from the first storing area in the image memory and writing the first image data into the display buffer memory and reading the second image data from the second storing area in the image memory and writing the second image data into a designated area in the display buffer memory.

12 Claims, 9 Drawing Sheets

FIG.7A SYNCHRONIZING SIGNALS
FIG.7B INPUT BUFFER
FIG.7C FRAME MEMORY
FIG.7D DISPLAY BUFFER

IMAGE PROCESSING APPARATUS FOR AN ON-SCREEN-DISPLAY WHICH DISPLAYS ONE IMAGE OVER ANOTHER IMAGE

This application is based on Japanese Patent Application HEI 11-89366, filed on Mar. 30, 1999, the entire contents of which are incorporated herein by reference.

BACKGROUND OF THE INVENTION a) Field of the Invention

This invention relates to an image-processing apparatus for an on-screen-display, which displays one image over another image.

b) Description of the Related Art

There is an electronic camera such as a digital still camera and a digital camcorder that have image sensors like CCDs. There is a technique called on-screen-display wherein image data output form the electronic camera are displayed onto a display device as a main image together with another image, e.g., text image, in a smaller size.

Figure 8:
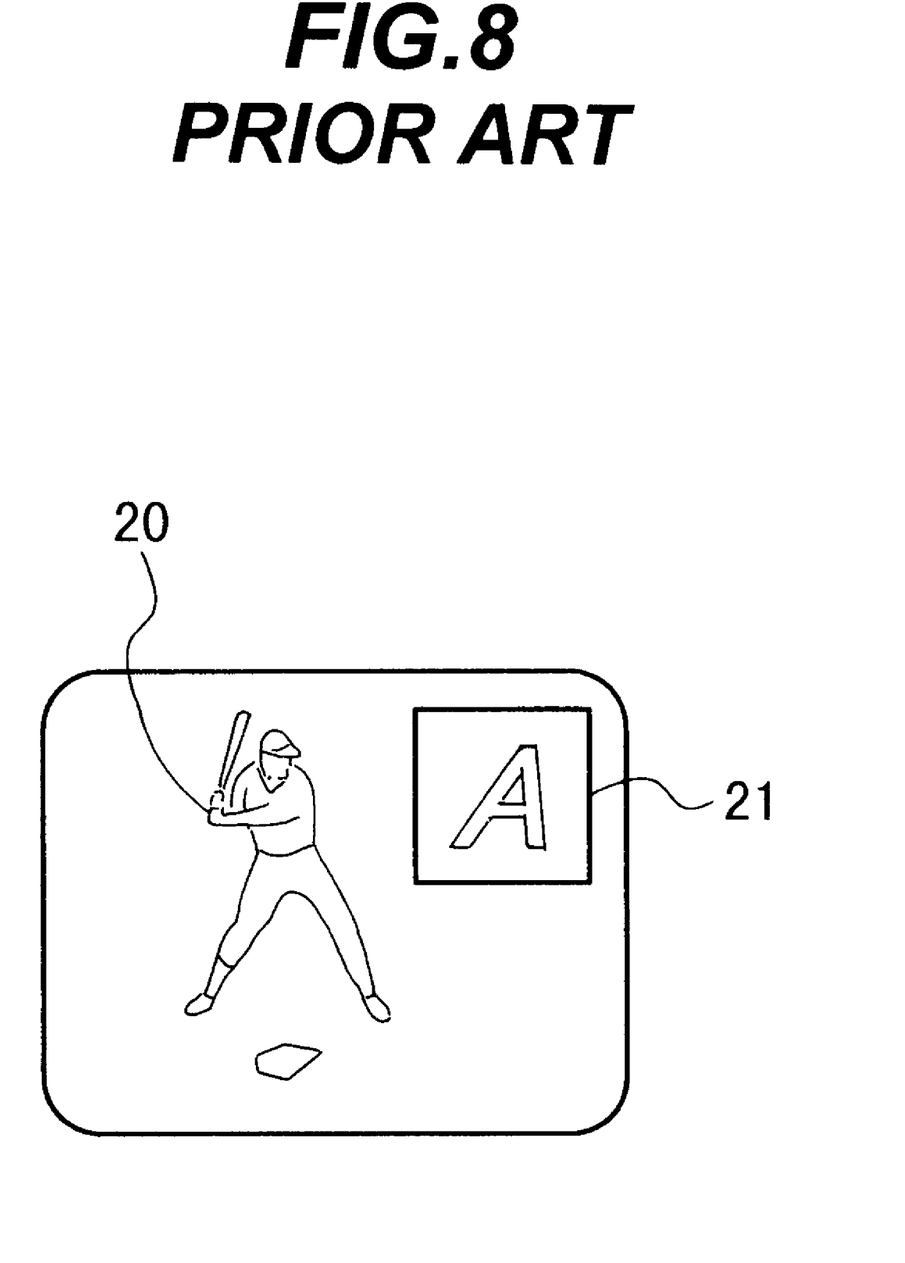
FIG. 8 shows an example of on-screen-display according to prior art.

FIG. 8 shows an example of the on-screen-display. A small still image 21 showing a letter "A" is displayed at the upper right corner of the display playing a movie 20 of a baseball player. A size of the still image 21 is smaller than that of a screen area of the display.

Figure 9:
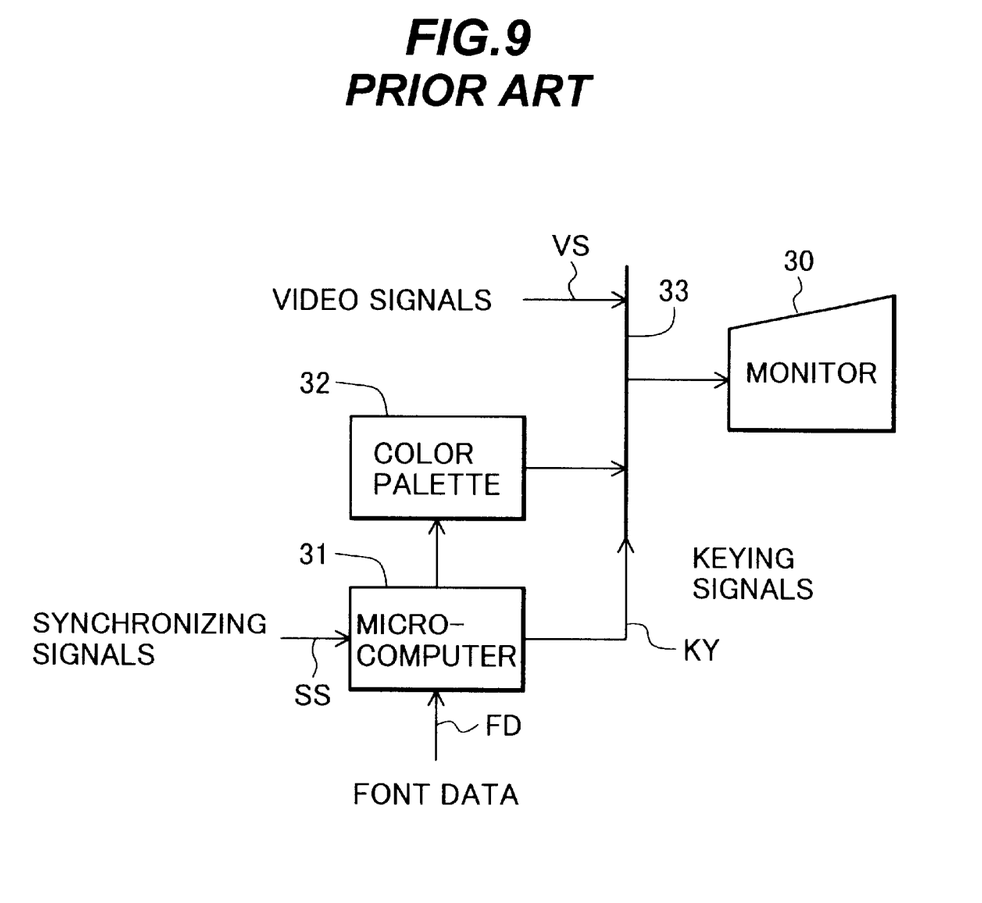
FIG. 9 is a block diagram showing the hardware structure of an on-screen-display apparatus according to prior art.

FIG. 9 shows an example of a structure of an on-screen-display device according to prior art. Video signals VS from a CCD or the like are inputted to a monitor (a display device) 30, and a picture according to the video signals VS is displayed on the monitor. The video signals VS correspond to the movie 20 of the baseball player in FIG. 8. Data for the on-screen-display, e.g., font data FD corresponding to the text image 21 of the letter "A" in FIG. 8, are inputted to a microcomputer 31.

The microcomputer 31 calculates the position and area of a screen where the text image 21 will be inserted based on synchronizing signals SS of the video signals VS. The microcomputer 31 counts the synchronizing signals SS up until the calculated position of the text image 21 and outputs a keying signal KY to a selector 33. Then the microcomputer 31 outputs color data, instead of the video signals of the movie of the baseball player, to the monitor 30 via the selector 33 for a pixel at a time. The color data contain color information of the letter "A" and its background of the text image 21 that are picked up from a color palette 32 on the basis of the font data. For example, the color palette 32 may be able to produce 256 colors.

The on-screen-display according to the prior art can only display a text image as an image displayed on the screen, and colors for the image displayed on the screen are limited to artificial primary colors produced by the color palette. Therefore, its capability of color expression is limited. Also, original video data is overwritten by text image data, and therefore the image data cannot be moved anywhere, and the image size cannot be changed.

SUMMARY OF THE INVENTION

It is an object of this invention to provide an image processing apparatus that can freely display onto an on-screen-display not only text information but also an image other than a text image and also a natural image including natural or transparent colors taken with a camera as a still or a motion picture.

According to one aspect of the present invention, there is provided an image processing apparatus comprising an image memory comprising a first storing area for storing first image data for a background and a second storing area for storing second image data for an on-screen-display; a display buffer memory for storing data in a format used for display based on said first and second image data read from said image memory; and a controller for controlling accesses to said image memory and said display buffer memory, the controller reading the first image data from said first storing area in said image memory and writing said first image data into said display buffer memory and reading the second image data from said second storing area in said image memory and writing said second image data into a designated area in said display buffer memory.

The first image data for a background and the second image data for on-screen-display are stored separately in the image memory. The first image data is read from the image memory and written in the display buffer memory, and then the second image data is read from the image memory and written in the display buffer memory. Not only the text image but also natural images can be used for an on-screen-display, and those images can be displayed in any sizes and at any positions on the screen. Also, those images can be moved afterward and colored in transparent colors or composite colors.

DETAILED DESCRIPTION OF THE PREFERRED EMBODIMENTS

Figure 1:
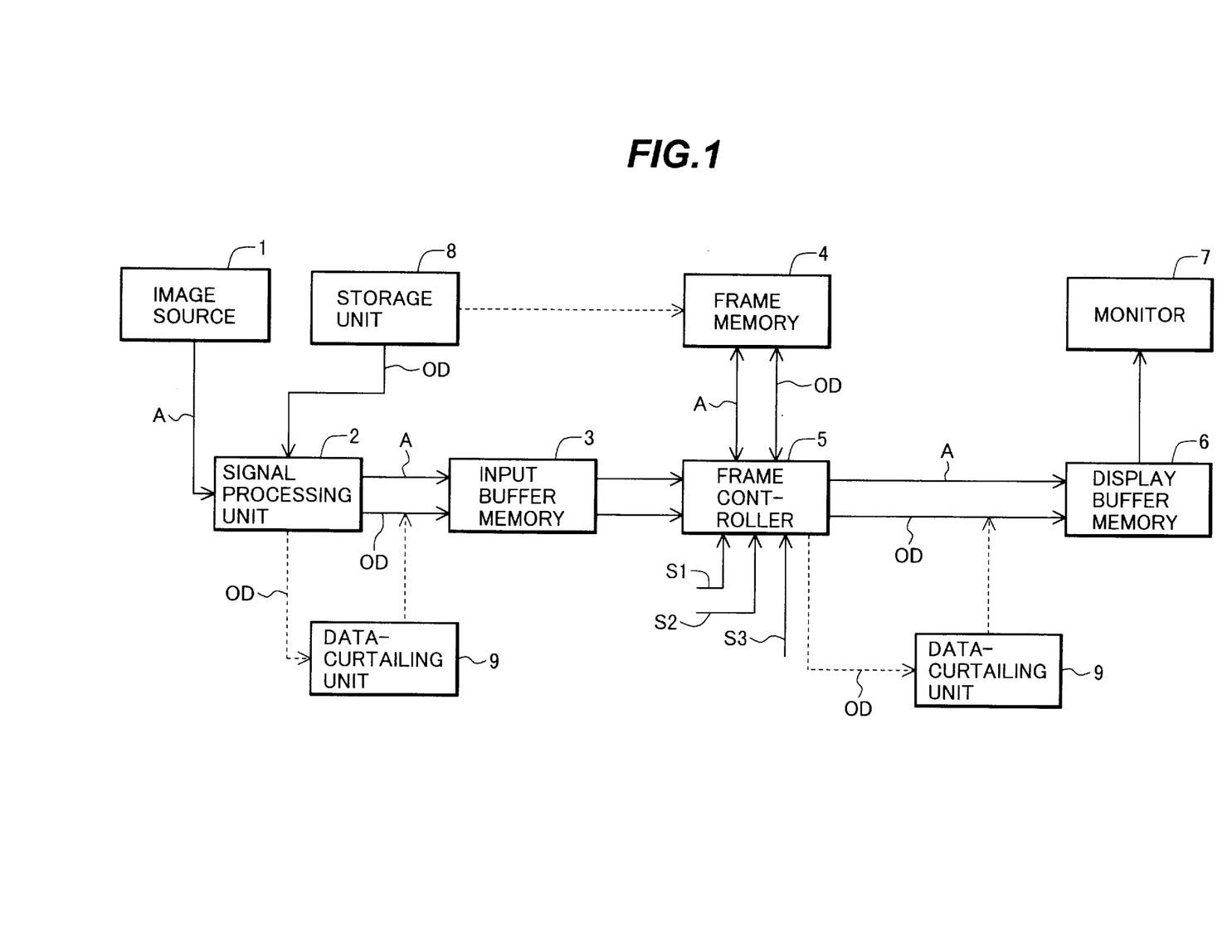
FIG. 1 is a block diagram showing the hardware structure of an on-screen-display apparatus according to an embodiment of this invention.

FIG. 1 is a block diagram showing the hardware structure of an on-screen-display apparatus according to an embodiment of this invention. An image-signal source 1 is, for example, a CCD in a digital camera. A signal-processing unit 2 processes video signals A transferred from the image-signal source 1, for example, at a transfer rate of 12.5 MHz. The processes performed in the signal-processing unit 2 include, for example, RGB/YC conversion, gamma adjustment and color adjustment. An input buffer memory 3 is a line memory wherein the processed video signals A for one scanning-line (a horizontal scan of display) are written at a time. A frame memory controller 5 writes the video data for a scanning-line stored in the input buffer memory 3 into a frame memory 4. The frame memory 4 may be a dynamic random access memory (DRAM) or a synchronous dynamic random access memory (SDRAM) and has much higher writing speed than the input buffer memory 3 does; therefore, the frame memory 4 can read and write data, for example, at 66 MHz.

Figure 2:
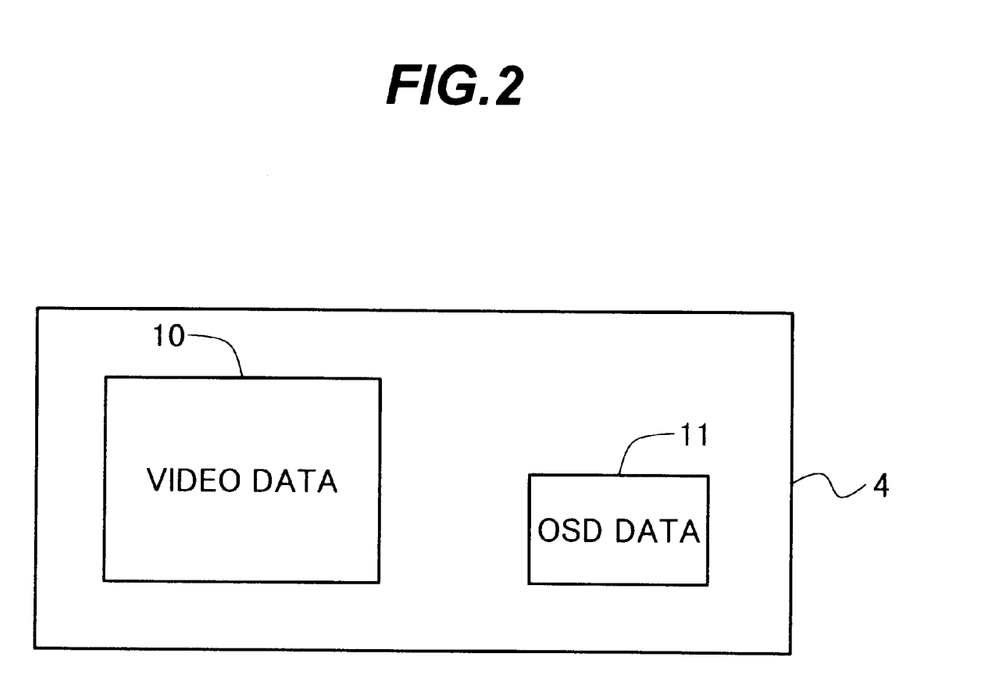
FIG. 2 is a block diagram showing a configuration of memory areas in the frame memory of the on-screen-display apparatus according to the embodiment of this invention.

FIG. 2 shows a configuration of memory areas in the frame memory 4. Video data A for one frame of main images (or background images) on the display are stored in an area 10, and on-screen-display (hereinafter called OSD) data OD are stored in an area 11. The OSD data OD are still image data and pre-stored in the frame memory 4. The OSD data OD may be inputted from the image source 1 (FIG. 1) as a movie data or read from a storage unit 8 (FIG. 1). The storage unit 8 is, for example, a hard disk drive or the likes. The video data A may also be stored in the storage unit 8 instead of being inputted from the image source 1.

The frame controller 5 reads data selectively from the video data area 10 or the OSD data area 11 in the frame memory 4 until one unit of image data for one scanning-line (line image data) is formed and writes the line image data into the display buffer memory 6. The unit of the line image data is read from the display buffer memory 6 and outputted to the monitor 7 in accordance with display-synchronizing signals. Input-synchronizing signals S1, display-synchronizing signals S3 and OSD-control signals S2 are inputted to the frame controller 5, and the frame controller 5 controls accesses to the frame memory 4 between the data memory areas 10 and 11.

The input buffer memory 3 has two ports; therefore, it can read and write data simultaneously. Also, the input buffer memory 3 may have two line memories so as to read and write data simultaneously by interchanging the two line memories.

Figure 3A:
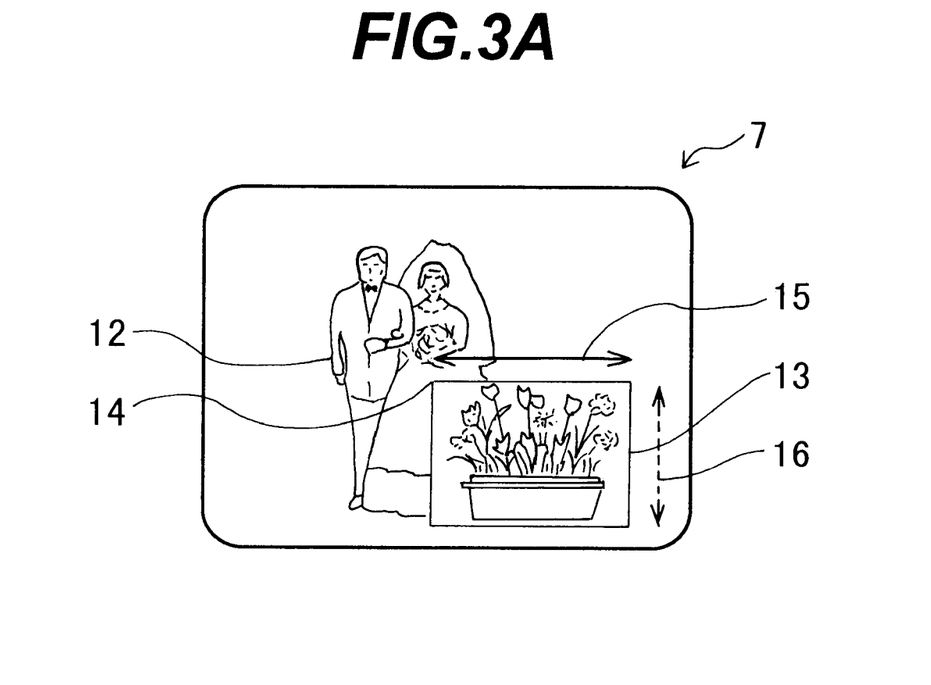
FIGS. 3A and 3B show examples of on-screen-displays according to the embodiment.

FIG. 3A shows an example of an on-screen-display according to the embodiment of this invention. On a screen of the monitor 7 are displayed a movie image 12 of a bride and a groom as a main image (a background image) and a small still image of flowers as an on-screen-display (OSD) image 13. In this example, the movie image 12 is based on data read from the video data area 10 in the frame memory 4, and the OSD image 13 is based on data read from the OSD data area 11 in the frame memory 4. The OSD image 13 is a square image with a small frame. A part of the movie image 12 is covered with the OSD image 13 and that part will be invisible.

Figure 3B:
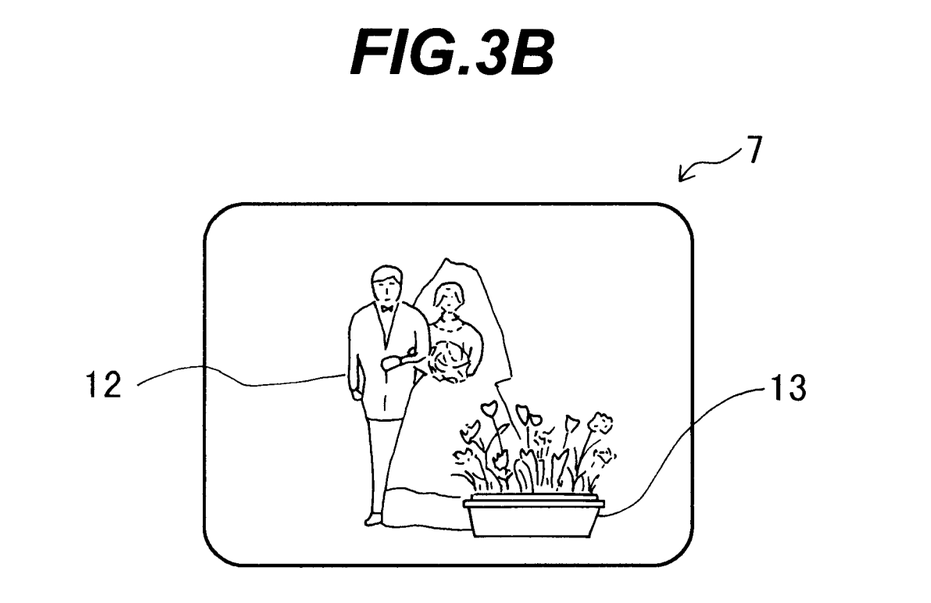
Figures 4A, 4B:
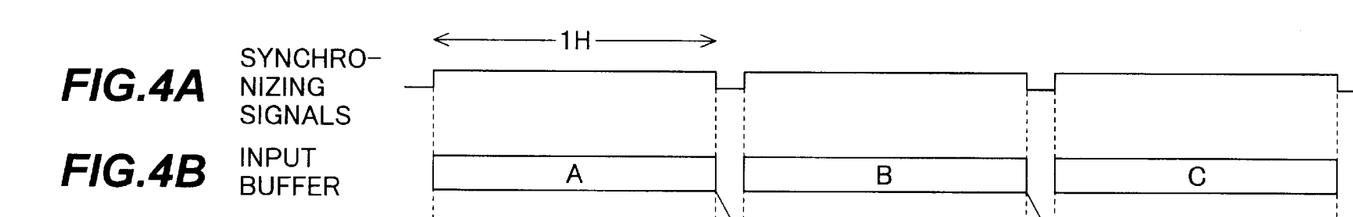
FIGS. 4A–4D are a timing chart of signal waveforms in some parts of the device shown in FIG. 1 when no on-screen-display is displayed.
Figure 4C:
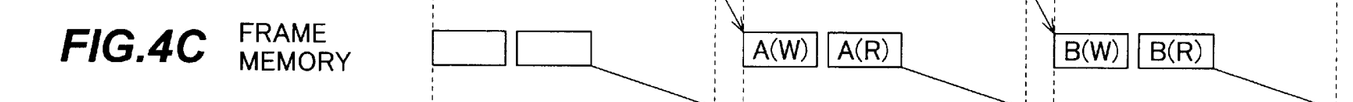
Figure 4D:
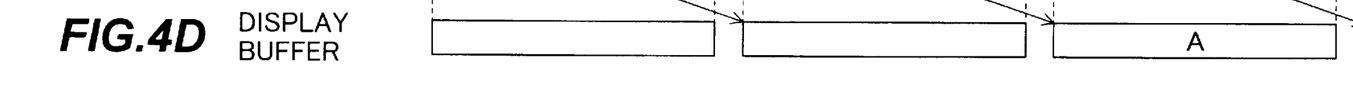
Figure 5A:
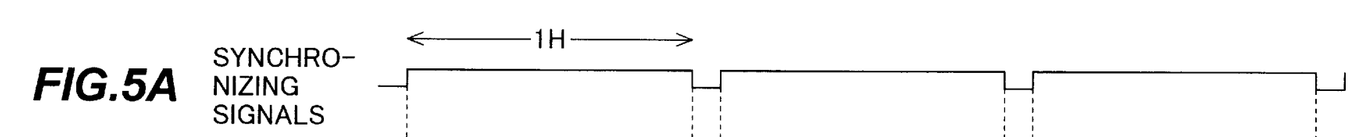
FIGS. 5A–5D are a timing chart of signal waveforms in some parts of the device shown in FIG. 1 when a still image is displayed as an on-screen-display.
Figure 5B:
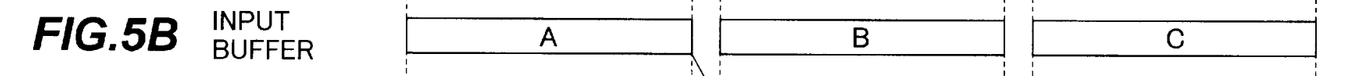
Figure 5C:
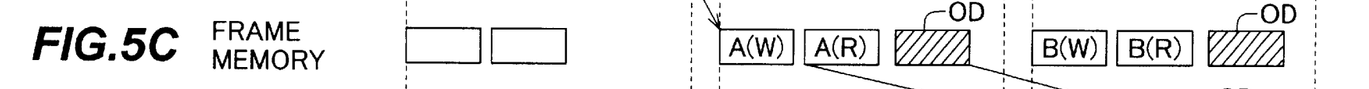
Figure 5D:
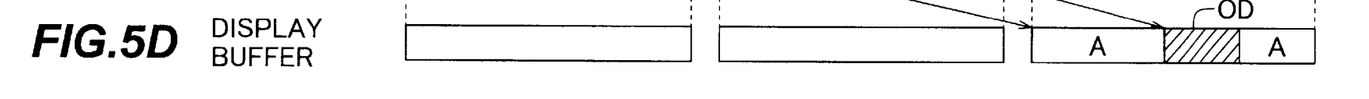

FIG. 3B shows another example of an on-screen-display according to the embodiment of this invention wherein the small frame of the OSD image 13 is not displayed. In this example, only the image of flowers is displayed as an OSD image 13. A background image in the small frame is transparent; therefore, the part of the movie image 12 that is covered with the background of the small frame will be visible.

Next, with reference to FIGS. 4A–4D and FIGS. 5A–5D, a displaying method of on-screen-display shown in FIGS. 3A and 3B will be described. FIGS. 4A–4D are a timing chart of signal waveforms in particular parts of the device shown in FIG. 1 when no on-screen-display is displayed. FIGS. 5A–5D are a timing chart of signal waveforms in the parts of the device shown in FIG. 1 when the on-screen-display is displayed as shown in FIGS. 3A and 3B. In these drawings, a waveform (a) represents both the input-synchronizing signals S1 of the input buffer memory 3 and the display-synchronizing signals S3 of the monitor 7 for the sake of convenience. A waveform (b) represents signals in the input buffer memory 3. A waveform (c) represents signals in the frame memory 4. A waveform (d) represents signals in the display buffer memory 6.

First, the display in case of FIGS. 4A–4D will be described. In the first one horizontal scan period 1H, video signals A for one scanning-line output from the signal-processing unit 2 is written in the input buffer memory 3 in synchronism to the input-synchronizing signals (a), for example, at 12.5 MHz rate to store the wave form (b). In the next one horizontal scan period, during video signals B for the next one scanning-line is written in the input buffer memory 3, the video signals A for one scanning-line stored in the input buffer memory 3 is written into the video data area 10 (FIG. 2) in the frame memory 4 at a high-speed rate of, for example, 66 MHz as write-video signals A (W) in the waveform (c).

Next, the video signals A for one scanning-line already written into the video data area 10 (FIG. 2) in the frame memory 4 are read synchronizing with the display-synchronizing signals (the waveform (a)) at the rate of 66 MHz as read-video signals A (R) in the waveform (c). Instead of the data A, any stored data for a scanning-line may be read at this time.

The data read from the frame memory 4 are written into the display buffer memory 6 (the waveform (d)). Then, in the next one horizontal scan period, the data within the display buffer memory 6 are output to the monitor 7 at a rate of 12.5 MHz to display the image. The above procedures are repeated for each scanning-line to be displayed. The image displayed in this case will be an image without the OSD image 13 in FIG. 3A.

Second, the on-screen-display shown in FIG. 3A will be described with reference to FIGS. 5A–5D. In this case, the still image data for the OSD image is pre-stored in the OSD data area 11 in the frame memory 4. The OSD data OD in FIG. 3A correspond to the image data of the flower image 13.

The OSD control signals S2 are inputted to the frame memory controller 5. The OSD control signals S2 include information about display-starting point 14, display sizes 15 and 16.

In the first one horizontal scan period 1H, video signals A for one scanning-line output from the signal-processing unit 2 is written in the input buffer memory 3 in synchronism to the input-synchronizing signals (a), for example, at 12.5 MHz rate as the waveform (b). In the next one horizontal scan period, during video signals B for the next one scanning-line is written in the input buffer memory 3, the video signals A for one scanning-line stored in the input buffer memory 3 is written into the video data area 10 (FIG. 2) in the frame memory 4 at a high-speed rate of, for example, 66 MHz as the write-video signals A (W) in the waveform (c).

Next, the video signals A for one scanning-line already written into the video data area 10 (FIG. 2) in the frame memory 4 are read synchronizing with the display-synchronizing signals (the waveform. (a)) at the rate of 66 MHz as the read video signals A (R) in the waveform (c). Instead of the data A, any stored data for a scanning-line may be read at this time.

The read video signals A (R) in the waveform (c) which are read from the frame memory 4 are written into the display buffer memory 6. Then, the OSD data OD are read from the OSD data area 11 in the frame memory 4 based on the OSD control signals S2 and written into an position corresponding to the display-starting point 14 in the display buffer memory 6 to overwrite (rewrite) the video signals A to form the waveform (d).

In the next one horizontal scan period, the data within the display buffer memory 6 are output to the monitor 7 at a rate of 12.5 MHz to display the image with the OSD image 13. The above procedures are repeated for each scanning-line to be displayed. The image displayed in this case will be an image with the OSD image 13 as in FIG. 3A, wherein the image 13 of flowers with a transparent background is on-screen-displayed.

If data for a transparent color are inserted to the OSD control signals S2, it will be possible to display the screen shown in FIG. 3B. By assigning a transparent color to the background area surrounding the flower image 13 within the small frame, the movie 12 underneath the background can be seen. The data representing a transparent color is, for example, "ffff" or the like, and assigned to the background of the flower image 13. In a pixel to which the data "ffff" is assigned, an OSD data OD is not written into the display buffer memory 6; therefore, the video data read from the area 10 remain in the display buffer memory 6.

Alternatively, the mean value of data in the video data area 10 and the OSD data area 11 may be displayed as an OSD image 13. In this case, mixture of both data will be displayed. In order to display the mixture image, a signal directing such a mean value calculation may be included in the OSD control signals S2. The mean value should be calculated before data will be written into the display buffer memory 6.

In an on-screen-display according to the embodiments of this invention, by storing OSD data OD and video data separately in the frame memory and reading them selectively form the frame memory for display, not only the text image but also natural images can be used for an on-screen-display, and those images can be displayed in any sizes and at any positions on the screen. Also, those images can be moved afterward and colored in transparent colors or composite colors. However, in the above description, the input- and display-synchronizing signals are the same, both synchronizing signals may be two independent signals.

Although, in each example of the on-screen-display shown in FIGS. 3A and 3B, the main image is the movie 12, and the OSD image 13 is a still image, a main image may be a still image and an OSD image may be a movie. An example for that case will be described below.

When an OSD image is a movie, the number of pixels in the movie must be lower than the number of pixels in a background main image. Therefore, if the number of pixels in the movie is larger than that of the main image, a data-curtailing unit 9 is placed between the signal-processing unit 2 and the input buffer memory 3 in FIG. 1, or between the frame memory controller 5 and the display buffer memory 6 in FIG. 1, for curtailing the amount of data before display to form image data in a predetermined size. As a data-curtailing unit 9, a conventional one can be used. Further, the image source 1 may supply curtailed image data.

In that case, the still image data for the main image is written into the area 10 in the frame memory 4 in FIG. 2, and the movie data for the OSD image are written into the area 11 in the frame memory 4 in FIG. 2. The still image data are pre-stored in the area 10.

Figures 6A, 6B, 6C:
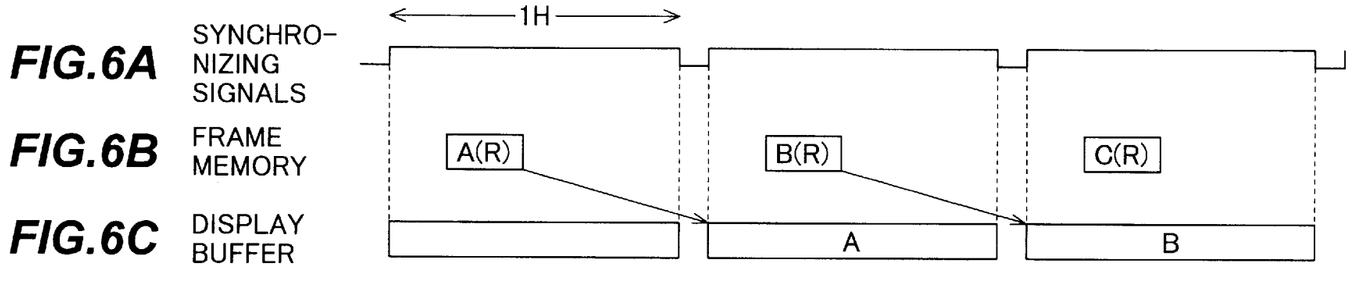
FIGS. 6A–6C are a timing chart of signal waveforms when only a still image as a main image is displayed.
Figure 7A:
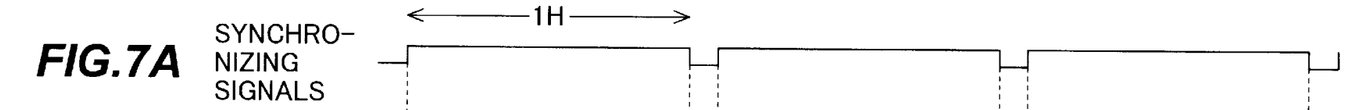
FIGS. 7A–7D are a timing chart of signal waveforms when a movie is displayed as an on-screen-display.
Figure 7B:
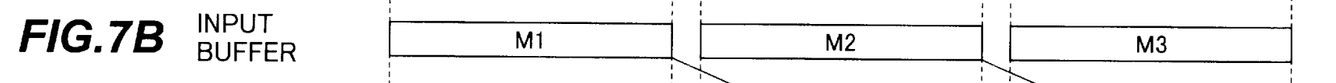
Figure 7C:
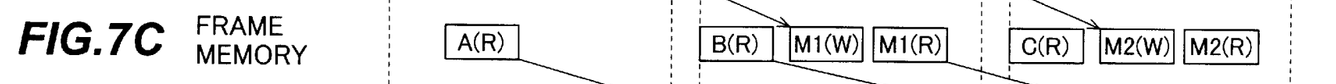
Figure 7D:
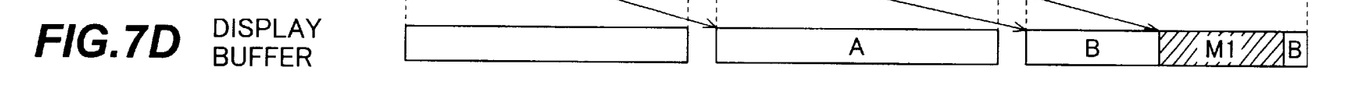

FIGS. 6A–6C are a timing chart of signal waveforms when only a still image as a main image is displayed. In the first one horizontal scan period 1H, pre-stored still image data A for one scanning-line are read from the area 10 in the frame memory 4 in synchronism to the input-synchronizing signals (a) at 66 MHz (A(R) in the waveform (b)). The data read from the frame memory 4 are written into the display buffer memory 6 (the waveform (c)).

Then, in the next one horizontal scan period, the still image is displayed on the monitor 7 by reading the data from the display buffer memory 6 at 12.5 MHz (the waveform (c)). The above procedures are repeated for each scanning-line to be displayed. The image displayed in this case will be an image without the OSD image 13 in FIG. 3A, and the main image 12 is a still image.

Next, a case when a movie is displayed as an OSD image over the still image will be explained in accordance with FIGS. 7A–7D. In this case, in the first one horizontal scan period 1H, pre-stored still image data A for one scanning-line are read from the area 10 in the frame memory 4 in synchronism to the input-synchronizing signals (a) at 66 MHz (A (R) in the waveform (c)). The data read from the frame memory 4 are written into the display buffer memory 6 (the waveform (d)).

OSD movie data (already written data M1 (W) in the waveform (c)) are read from the OSD data area 11 in the frame memory 4 based on the OSD control signals S2 as the read-data M1(R) and written into a position corresponding to the display-starting point in the display buffer memory 6 to overwrite (rewrite) the still image. Then, in the next one horizontal scan period, the data within the display buffer memory 6 are output to the monitor 7 at a rate of 12.5 MHz to display the still image with the OSD movie image (the waveform (d)). By repeating the above procedures for each scanning-line to be displayed, the image with the OSD movie image can be displayed.

One OSD image is displayed in each of the above embodiments; however, two or more OSD images can be displayed over the main image simultaneously.

Although this invention has been described in connection with the preferred embodiments, the invention is not limited only to the above embodiments. It will be apparent to those skilled in the art that various modifications, improvements, combinations and the like can be made.

What are claimed are:

1. An image processing apparatus comprising:
   an image memory comprising a first storing area for storing first image data for a background and a second storing area for storing second image data for an on-screen-display;
   a display buffer memory for storing data in a format used for display based on said first and second image data read from said image memory; and
   a controller for controlling accesses to said image memory and said display buffer memory, the controller reading the first image data from said first storing area in said image memory and writing said first image data into said display buffer memory and reading the second image data from said second storing area in said image memory and writing said second image data into a designated area in said display buffer memory.

2. An image processing apparatus according to claim 1, wherein said first image data are movie image data for the background and said second image data are still image data displayed on said background as the on-screen-display.

3. An image processing apparatus according to claim 2, further comprising a data curtailing unit for curtailing number of pixels from each frame of the movie image data for said first image data inputted,
   wherein said controller writes the curtailed movie image data from said curtailing unit into said first storing area in said image memory as said first image data.

4. An image processing apparatus according to claim 2, further comprising an input buffer memory for buffering the movie image data inputted, wherein said controller reads the movie image data from said input buffer memory and writes the movie image data into said image memory as said first image data;

said input buffer memory is a memory which can store image data for one scanning line;

said image memory is a memory which can store image data and on-screen-display data for one frame separately; and said display buffer memory which can store image data for one scanning line.

5. An image processing apparatus according to claim 4, wherein the movie image data are read from and written to said image memory faster than the movie image data are written to said input buffer memory.

6. An image processing apparatus according to claim 1, wherein said first image data are still image data for the background and said second image data are movie image data displayed on said background as the on-screen-display.

7. An image processing apparatus according to claim 6, further comprising a data curtailing unit for curtailing number of pixels from each frame of the movie image data for said second image data inputted, wherein said controller writes the curtailed movie image data from said curtailing unit into said second storing area in said image memory as said second image data.

8. An image processing apparatus according to claim 6, further comprising an input buffer memory for buffering the movie image data inputted, wherein said controller reads the movie image data from said input buffer memory and writes the movie image data into said image memory as said second image data;

said input buffer memory is a memory which can store image data for one scanning line;

said image memory is a memory which can store image data and on-screen-display data for one frame separately; and said display buffer memory which can store image data for one scanning line.

9. An image processing apparatus according to claim 8, wherein the movie image data are read from and written to said image memory faster than the movie image data are written to said input buffer memory.

10. An image processing apparatus according to claim 1, wherein said controller writes said second image data for the on-screen-display, based on information about a display position of said second image data for the on-screen-display, into an area in said display buffer memory corresponding to the display position.

11. An image processing apparatus according to claim 1, wherein said second image data for the on-screen-display comprises transparent color data, and said controller does not write said transparent color data into said display buffer memory to leave said first image data for the background at a position in said display buffer memory, corresponding to a display position of the transparent color data.

12. An image processing apparatus according to claim 1, wherein said controller writes a mean value of said second image data for the on-screen-display and said first image data for the background to be displayed at a same position as said second image data into said display buffer memory as image data for the on-screen display.

* * * * *